No. 733,612. Patented July 14, 1903.

UNITED STATES PATENT OFFICE.

WILLIAM J. ARMBRUSTER, OF ST. LOUIS, MISSOURI.

PROCESS OF MAKING PIGMENTS.

SPECIFICATION forming part of Letters Patent No. 733,612, dated July 14, 1903.

Application filed October 31, 1902. Serial No. 129,594. (No specimens.)

*To all whom it may concern:*

Be it known that I, WILLIAM J. ARMBRUSTER, a citizen of the United States, residing at St. Louis, State of Missouri, have invented certain new and useful Improvements in Processes of Making Pigments, of which the following is a specification.

My invention has relation to improvements in processes of making pigments; and it consists in the novel series of steps more fully set forth in the specification and pointed out in the claims.

Broadly stated, the process contemplates the successive or simultaneous precipitation of zinc hydrate and barium sulfate from solutions of zinc, barium hydrate, and the sulfate of preferably an alkali metal.

As a general illustration of the process I prepare aqueous solutions of barium hydrate, zinc nitrate, and sodium sulfate. The barium hydrate and zinc nitrate are brought together, when zinc hydrate is precipitated and barium nitrate is formed in solution. To the latter is added the sodium sulfate, when barium sulfate is precipitated and sodium nitrate formed in solution. The foregoing may be expressed by the following reactions:

$$Ba(OH)_2 + Zn(NO_3)_2 = Zn(OH)_2 + Ba(NO_3)_2;$$
$$Ba(NO_3)_2 + Na_2SO_4 = BaSO_4 + 2NaNO_3.$$

Without departing from the principle of my invention I may use other salts of zinc, such as chlorid, acetate, and, under certain restrictions, the sulfate. So, too, may I employ the sulfate of any of the alkali metals or aluminium sulfate in lieu of the sodium sulfate to effect the precipitation of the barium sulfate. Where sulfate of aluminium is used, the reaction would be as follows, (eliminating from consideration the water of crystallization of the aluminium salt:)

$$3Ba(NO_3)_2 + Al_2(SO_4)_3 = 3BaSO_4 + Al_2(NO_3)_6.$$

It will be readily understood that the acid of the final salt solution will correspond to the acid of the zinc salt used, while the base of the final solution will correspond to the base of the sulfate used.

It is not necessary, of course, that the order of bringing the solutions together shall be as illustrated above, since the order can be qualified without departing from the spirit of the invention, thus:

$$Ba(OH)_2 + Na_2SO_4 = BaSO_4 + 2NaOH;$$
$$2NaOH + Zn(NO_3)_2 = Zn(OH)_2 + 2NaNO_3.$$

If desired, the respective solutions can be brought together simultaneously, thus:

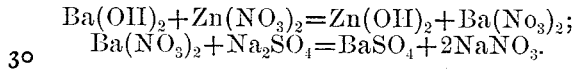

While the precipitates under the last illustration are formed practically simultaneously, yet the reactions which take place are successive, either the barium sulfate being first precipitated with the formation of sodium hydrate, which then reacts with the zinc salt, precipitating zinc hydrate and forming a sodium salt in solution, or the zinc hydrate is first precipitated and then the barium sulfate, precedence taking place (as is obvious) according to the relative volumes of the respective solutions present in the reaction. In general, however, the barium sulfate (owing to its great insolubility) will be precipitated first.

Additional equivalents of barium solution can be added in other than the hydrate form, especially if it is desired to produce a pigment with a preponderance of barium sulfate. This is clearly illustrated by the following reactions:

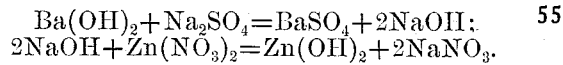
or
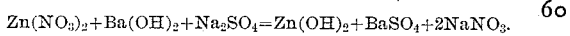

The additional equivalent of barium solution can even be the sulfid if it be added after the precipitation of the barium sulfate is affected, thus:

$$Ba(OH)_2 + Na_2SO_4 = BaSO_4 + 2NaOH$$
$$2NaOH + ZnSO_4 = Zn(OH)_2 + Na_2SO_4$$
$$Na_2SO_4 + BaS = BaSO_4 + Na_2S.$$

It was stated above that under certain restrictions I may employ the sulfate of zinc in lieu of the nitrate, chlorid, acetate, &c. This restriction is illustrated in the last series of reactions and obviously has reference to the time of adding this reagent—that is to say, it must be added so as to avoid double precipitation with the barium hydrate used, for it is obvious that if the sulfate of zinc were added directly to the barium hydrate there would result a double precipitate of zinc hydrate and barium sulfate, thus:

$$Ba(OH)_2 + ZnSO_4 = Zn(OH)_2 + BaSO_4,$$

a process not contemplated by the present invention. The last reaction, too, illustrates the necessity of adding the sulfid of barium subsequent to the precipitation of the zinc as hydrate, for if added before the zinc would come down as the sulfid, owing to the great affinity between this base and sulfur.

The following reaction may be cited as a further example of the use of the sulfate of zinc as the reagent after the barium has been precipitated as the sulfate, this reaction also illustrating the possibility of restoring the composition of the original sulfate used in the precipitation of the barium, such restored sulfate being capable of use in subsequent repetitions of the process, thus:

$$Ba(OH)_2 + Na_2SO_4 = BaSO_4 + 2NaOH;$$
$$2NaOH + ZnSO_4 = Zn(OH)_2 + Na_2SO_4.$$

The sulfate of sodium, as is obvious, can be used in subsequent precipitations of the barium hydrate, making the process a cyclical one.

The final solution remaining in any case after precipitation is to be drained from the precipitates and can be recovered in a merchantable form by evaporation to a crystalline condition. The recovered precipitates are washed, the surplus water separated in any suitable manner, and the pigment dried if desired. The zinc-hydrate constituent can be converted to zinc oxid in any suitable manner, such as by calcination, and this may be done either before or after mixture with the barium sulfate. I may of course invoke the doctrine of chemical equivalents wherever the same apply.

As a commercial illustration of the process under the first reaction the following may be cited: Separate aqueous solutions are prepared as follows: zinc nitrate, one hundred and eighty-nine (189) pounds; barium hydrate, one hundred and seventy-one (171) pounds, and sodium sulfate one hundred and forty-two (142) pounds. The zinc nitrate and barium hydrate are brought together, when ninety-nine pounds of zinc hydrate are precipitated and two hundred and sixty-one (261) pounds of barium nitrate are formed in solution. To the latter is added the sodium-sulfate solution, when two hundred and thirty-three (233) pounds of barium sulfate are precipitated and one hundred and seventy (170) pounds of sodium nitrate formed in solution. The precipitates and final solution are treated as previously described.

The above figures are based on anhydrous salts, the water of crystallization being eliminated from the calculations.

Having described my invention, what I claim is—

1. The process of making pigment which consists in mixing solutions of barium hydrate and other soluble barium salts, a salt of zinc, and a sulfate capable of precipitating the barium as a sulfate, substantially as set forth.

2. The process of making pigment which consists in mixing solutions of barium hydrate, a salt of zinc other than the sulfate, and a suitable sulfate having a base other than zinc capable of precipitating the barium as a sulfate, and recovering the resulting precipitates, substantially as set forth.

3. The process of making pigment which consists in mixing solutions of barium hydrate, a salt of zinc other than the sulfate, and the sulfate of an alkali metal, and recovering the resulting precipitates, substantially as set forth.

4. The process of making pigment which consists in mixing solutions of barium hydrate, a sulfate other than zinc capable of precipitating the barium as a sulfate, then adding a salt of zinc adapted to be precipitated as the hydrate, and recovering the resulting precipitates, substantially as set forth.

5. The process of making pigment which consists in mixing solutions of barium hydrate, zinc nitrate, and sodium sulfate, and recovering the resulting precipitates, substantially as set forth.

6. The process of making pigment which consists in mixing solutions of barium hydrate, and a salt of zinc other than the sulfate in the presence of a sulfate having a base other than zinc whereby the barium is precipitated as the sulfate, and the zinc as the hydrate, substantially as set forth.

7. The process of making pigment which consists in mixing solutions of barium hydrate and other soluble barium salts, and a salt of zinc, in the presence of a sulfate whereby the barium is precipitated as the sulfate, and the zinc as the hydrate, substantially as set forth.

In testimony whereof I affix my signature in presence of two witnesses.

WILLIAM J. ARMBRUSTER.

Witnesses:
EMIL STAREK,
G. L. BELFRY.